Patented Mar. 28, 1950

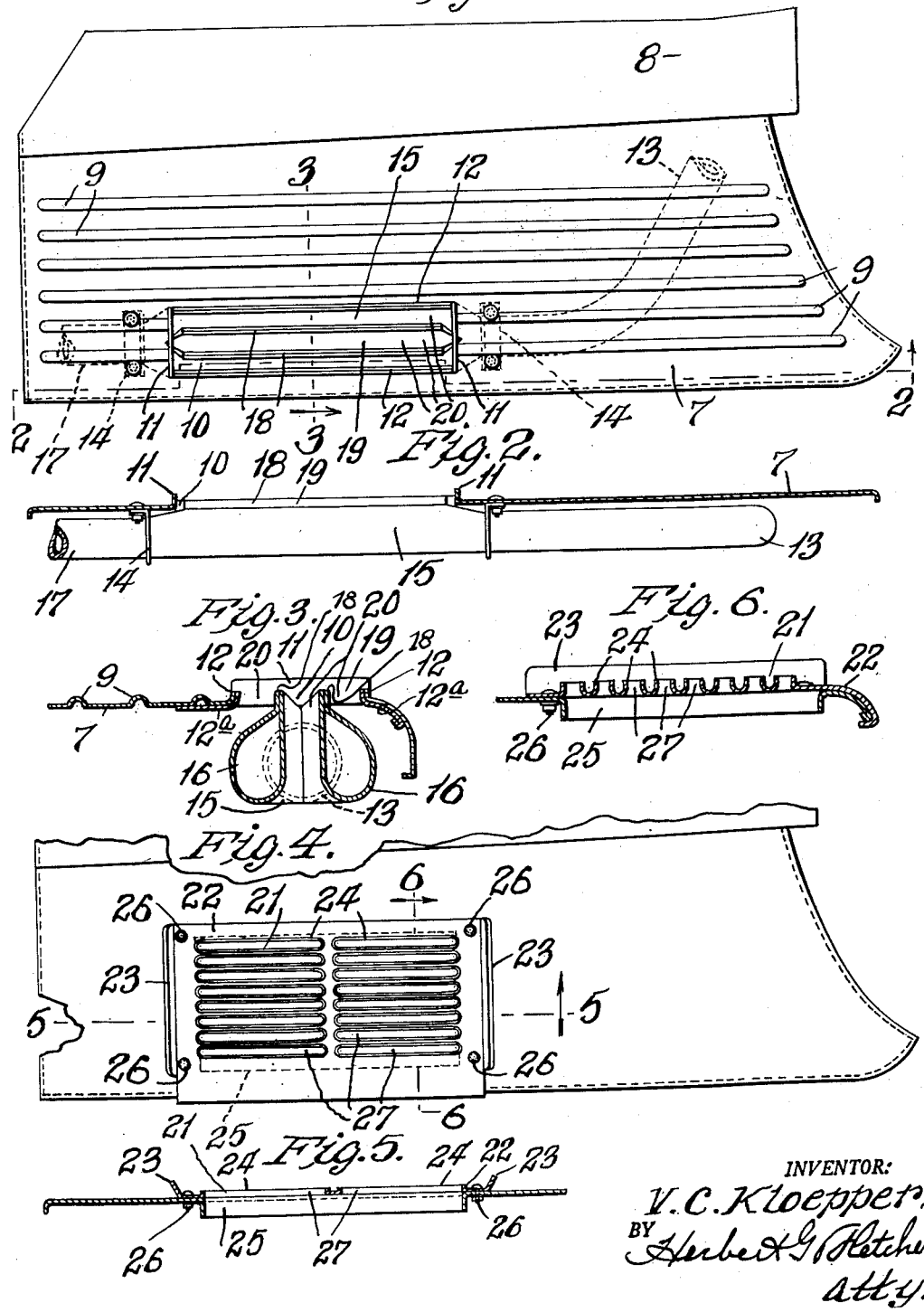

2,501,819

UNITED STATES PATENT OFFICE 2,501,819

RUNNING BOARD FOR AUTO TRUCKS AND THE LIKE

Valentine C. Kloepper, Detroit, Mich.

Application March 20, 1946, Serial No. 655,751

2 Claims. (Cl. 180—54)

1

This invention relates to certain new and useful improvements in running boards for auto trucks and particularly the running boards or steps of delivery trucks where it is required of the truck operator or accompanying delivery man, to repeatedly use the step or running board in making house to house deliveries and the like, through the winter months of the year, when ice and snow are frequent, thus causing insecure footholds in walking and stepping, due to icy and slippery conditions.

With the above in view, it is therefore an object of the invention to provide the stepping or foot engaging part of a vehicle running board with a grille or grated section so that foot accumulation of mud, snow and the like, can be scraped off by sheared edges formed on the grille with the off-fall falling through the interstices or opening thereof.

Another object is to provide the running board grille with end disposed foot slipping arresters.

A further object is to provide the running boards of trucks and the like, with heating means for preventing freezing of mud and snow accumulation thereon.

A still further object is to entrain the exhausting products of combustion from an internal combustion engine of a truck, to and beneath a running board of the truck for keeping it sufficiently heated to prevent freezing of foot off-fall accumulations thereon.

With the foregoing and other objects in view which will appear as the description proceeds, my invention resides in the combination and arrangement of parts and in the details of construction hereinafter described and claimed, it being understood that changes may be made within the scope of what is claimed without departing from the spirit and intents of the invention.

An embodiment of the invention is illustrated in the accompanying drawing, wherein:

Figure 1 is a plan elevation of a vehicle running board with one form of the invention applied thereto.

Figure 2 is a longitudinal section taken approximately on the line 2—2 of Fig. 1.

Figure 3 is an enlarged fragmentary transverse section taken approximately on the line 3—3 of Fig. 1.

Figure 4 is a fragmentary plan elevation of a vehicle running board with a modification of the invention shown as forming a part thereof.

Figure 5 is a longitudinal section taken approximately on the line 5—5 of Fig. 4.

2

Figure 6 is an enlarged transverse section taken approximately on the line 6—6 of Fig. 5.

The running board shown in Fig. 1 of the drawing, is of the conventional type as used on auto trucks for hauling and delivery purposes, and comprises the board or step 7 having the upwardly disposed apron 8 for securing the running board to the truck frame (not shown), and the board 7 having the usual raised longitudinal ribs 9 for reenforcement of the board, and for foot gripping use.

Specifically, the invention comprises the application and use of a heating element to the running board for preventing freezing of foot scrapings occasioned by the repeated stepping use of the truck driver on the board or step, during freezing weather; and to provide a grille in the running board, having spaced upstanding foot scraping edges, so that the foot scraped slush and the like can fall through the spaces between the scraping edges.

Referring to Figs. 1, 2 and 3, the sheet metal running board step 7 has a portion cut away to provide a required size opening 10, the material at the end edges of the opening being upwardly bent at 11, and at the side edges being upwardly bent at 12 and are reenforced by respective strips 12a, secured thereto and to the board 7 by spotwelding or the like.

An exhaust pipe 13 which extends from the exhaust manifold of the internal combustion engine of the truck (not shown), is entrained to and hung beneath the board 7 by a pair of hangers 14, the part 15 of the exhaust pipe between the hangers being divided into a pair of branches 16 and join with the tail end 17 of the exhaust pipe adjacent the rear hanger for providing greater heat distribution from the part 15 to the board 7.

Each branch 16 of the exhaust pipe 13 has a horizontally extending portion 18 projecting into the opening 10 of the board 7, the upper edges of which being in horizontal alinement with the upper edges of the upwardly bent side portions 12 and their related strips 12a, said portions 12 and 18 serving as foot scrapers on the grille 19 formed thereby, and the end portons 11 whose upper edges extend above those of the portions 12 and 18, serving as end stops for the grille against which the stepping foot of the truck operator can abut in preventing or stopping side slipping.

In using a running board of this improved character on a truck or the like, which is powered by an internal combustion engine, in freezing weather, the exhausting products of combustion from the engine discharging through the exhaust pipe 13 will be radiated from the part 15 and/or muffler to the grille 19, thereby heating the grille sufficiently to prevent scraped-off foot accumulations from clogging by freezing on or between the foot scraping edges 12 and 18 so that the scrapings will fall through the longitudinal openings 20 of the grille.

The modified structure of grille designated at 21, Figs. 4, 5 and 6 of the drawing, comprises a sheet metal plate 22 having upwardly bent end disposed portions 23 and a plurality of upstanding intermediately disposed struck-out or extruded longitudinal portions 24.

An opening 25 is formed in the running board over which the grille 21 is mounted and secured by bolts 26 or the like, the grille thus forming a step on the running board with the longitudinal upstanding portions 24 serving as foot scrapers and the end portions 23 serving as foot stops for preventing foot side slip, and the foot scrapings falling through the slots or openings 27 provided by the extruded portions or foot scrapers 24.

If desired, the exhaust pipe 13 and/or the muffler of the exhaust line may lie disposed beneath the grille 21 for heating and melting purposes, somewhat in the manner as shown in connection with the structure in Figs. 1, 2 and 3.

From the above disclosure of this invention, it is obvious that slipping hazards due to muddy and icy conditions are at least minimized by the application and use of my invention.

Obviously constructional modifications of the device shown, are possible without departing from the spirit of the present invention and therefore it is to be understood that it is not necessary to limit the invention by the terms used in the foregoing description, excepting such as the state of the art may require.

What I claim is:

1. A vehicle having a running board with an opening formed therein, an internal combustion engine for propelling the vehicle having exhausting means extending beneath the opening of said running board, foot scraping portions extending from said exhausting means through said running board opening, and a foot arresting portion disposed at each end of the running board opening.

2. A vehicle having a running board with an opening formed therein, an internal combustion engine for propelling the vehicle having exhausting means extending beneath the running board, said exhausting means having a pair of branching parts disposed beneath the running board opening, and upwardly disposed portions extending from said branching parts and through the running board opening, said portions being for foot scraping purposes.

VALENTINE C. KLOEPPER.

REFERENCES CITED

The following references are of record in the file of this patent:

UNITED STATES PATENTS

| Number | Name | Date |
|---|---|---|
| 756,507 | Knopf | Apr. 5, 1904 |
| 1,413,265 | Dodge | Apr. 18, 1922 |
| 1,578,864 | Stanwood | Mar. 30, 1926 |
| 1,597,638 | Vincent | Aug. 24, 1926 |
| 1,992,003 | Cook | Feb. 19, 1935 |
| 2,296,629 | Coppock | Sept. 22, 1942 |
| 2,312,812 | Geyer | Mar. 2, 1943 |

FOREIGN PATENTS

| Number | Country | Date |
|---|---|---|
| 267,112 | Germany | Nov. 6, 1913 |